July 4, 1950 F. H. OWENS 2,514,086

RADIO VOTING AND PROGRAM RECORDING

Filed Sept. 15, 1943 5 Sheets-Sheet 1

INVENTOR
FREEMAN H. OWENS
BY Philip S. McLean
ATTORNEY

INVENTOR
FREEMAN H. OWENS
BY Philip S. McLean
ATTORNEY

RADIO VOTING AND PROGRAM RECORDING

Filed Sept. 15, 1943 5 Sheets-Sheet 3

INVENTOR
FREEMAN H. OWENS
BY Philip S. McLean
ATTORNEY

INVENTOR
FREEMAN H. OWENS
BY Philip S. McLean
ATTORNEY

July 4, 1950 F. H. OWENS 2,514,086

RADIO VOTING AND PROGRAM RECORDING

Filed Sept. 15, 1943 5 Sheets-Sheet 5

INVENTOR.
FREEMAN H. OWENS
BY
Philip S. McLean

Patented July 4, 1950

2,514,086

UNITED STATES PATENT OFFICE 2,514,086

RADIO VOTING AND PROGRAM RECORDING

Freeman H. Owens, New York, N. Y.

Application September 15, 1943, Serial No. 502,717

14 Claims. (Cl. 346—37)

The invention disclosed herein relates to voting and to the recording of opinions, radio programs listened to, and the like.

The several forms of the invention disclosed are shown and disclosed in copending Patents No. 2,337,568 of Dec. 28, 1943, 2,411,890 of December 3, 1946 and 2,403,454 of July 9, 1946.

Special objects of the invention are to provide practical means for enabling radio listeners to express opinions as to the relative merits of different programs or selections, to express preferences by voting on questions under consideration, candidates, etc., to show the selection of and relative popularity of different programs and to record such factors, all with mechanism of relatively simple, inexpensive construction, readily applicable to or combined with existing or specially built radio apparatus.

Further special objects are to provide a practical form of magazine structure for holding and advancing the tape or strip on which the record is made and in a form adapted to be readily mounted in or be removed from the radio receiver or other apparatus with which it is used.

Other desirable objects and the novel features by which the purposes of the invention are attained will appear or are set forth in the following specification.

The drawings accompanying and forming part of the specification illustrate several of the many possible embodiments of the invention. Actual physical structure, however, may be modified and changed in different ways, all within the true intent and broad scope of the invention as hereinafter defined and broadly claimed. The illustration, therefore, is to be considered primarily by way of disclosure rather than by way of limitation, true scope of the invention being as defined in the following specification and claims.

Fig. 1 in the drawings is a broken part sectional view of a form of the recorder as mounted in a program preselecting receiver of the type disclosed in co-pending Patent No. 2,337,568 of December 28, 1943.

Figures 8, 9, 10:
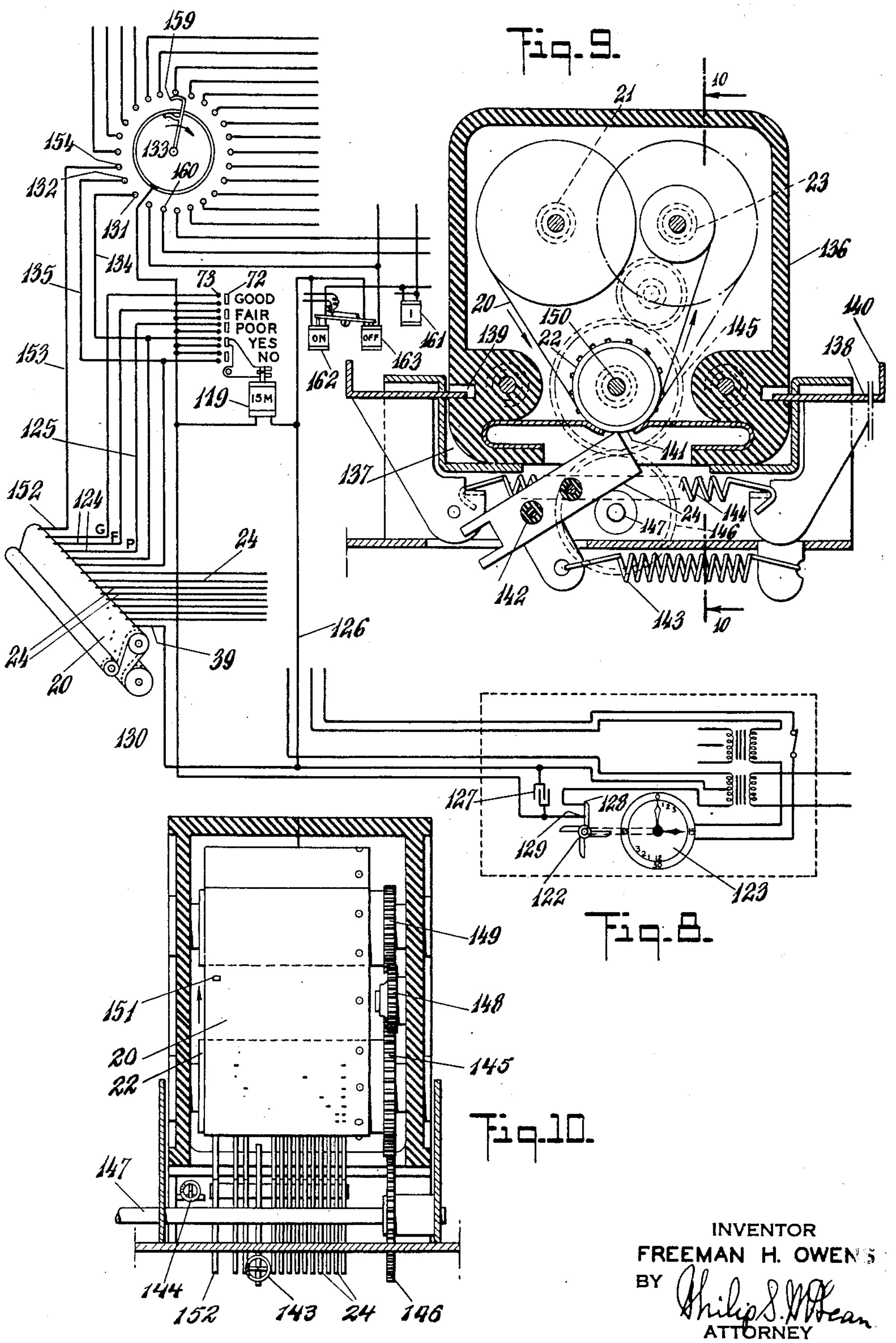
Fig. 8 is a wiring diagram.

Figs. 9 and 10 are sectional views illustrating a modified form of the recorder, Fig. 9 being taken on substantially the plane of line 9—9 of Fig. 10 and Fig. 10 appearing as on substantially the plane of line 10—10 of Fig. 9.

Figure 11:
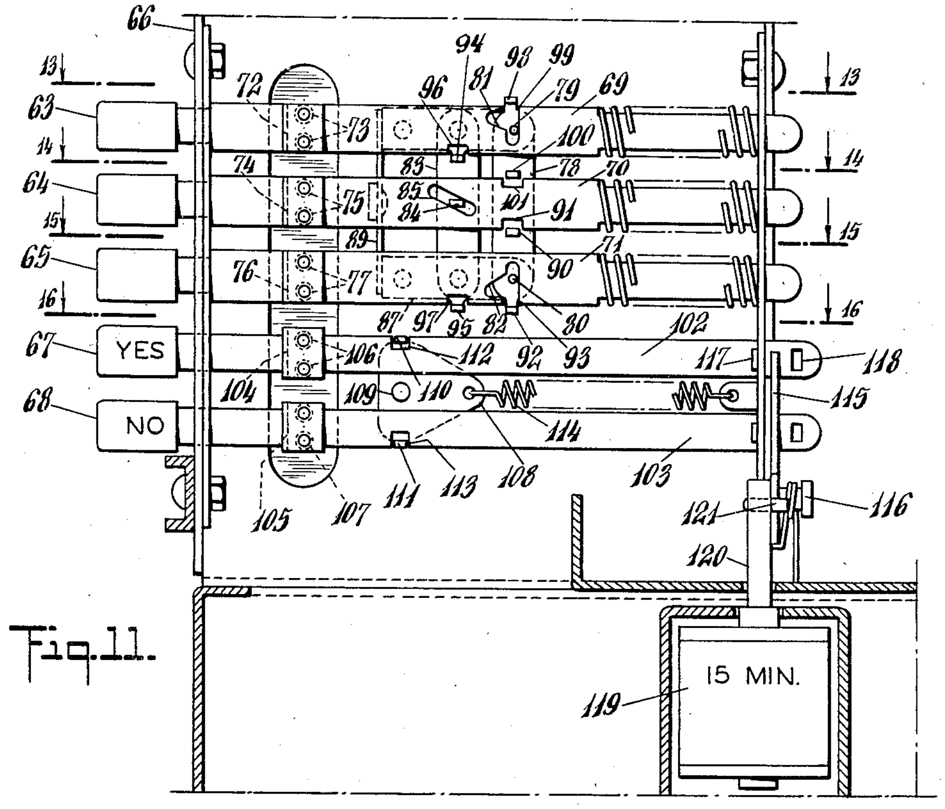
Figure 12:
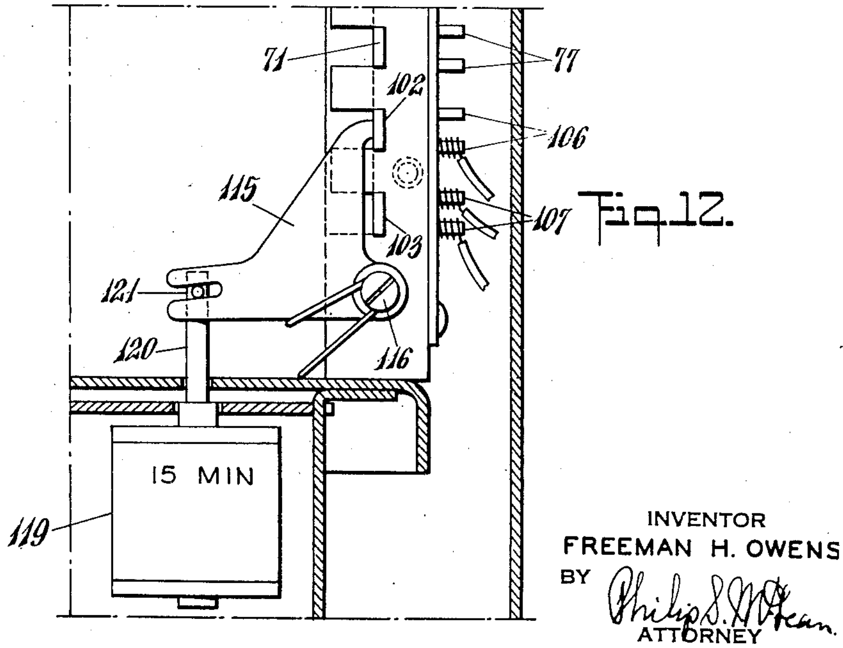
Figures 13, 14, 15, 16:
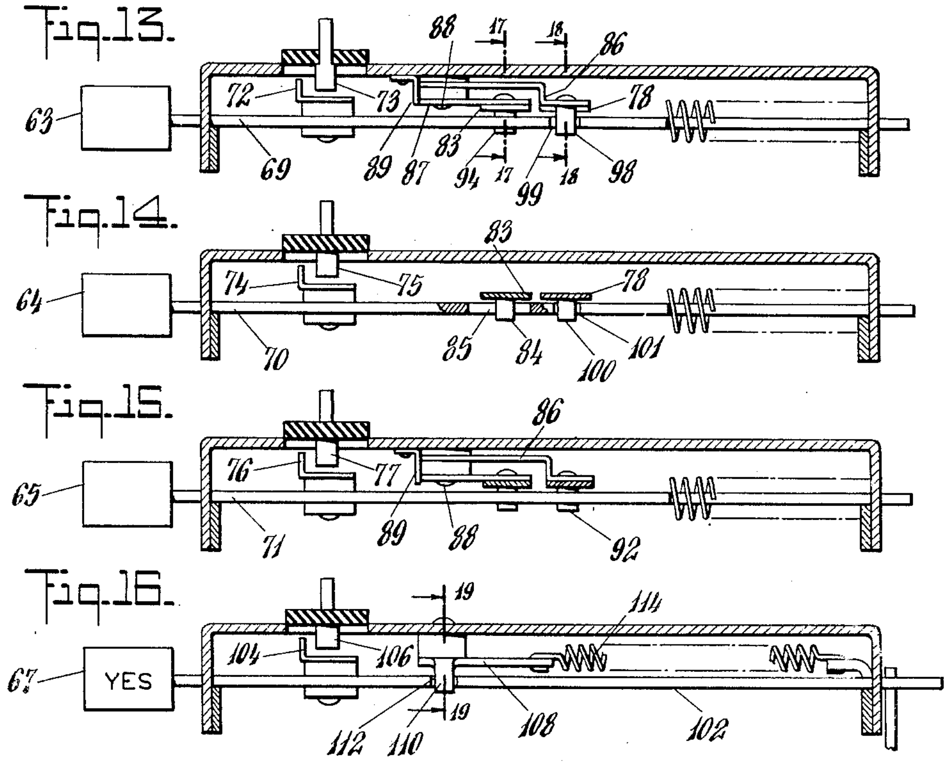
Figure 17:
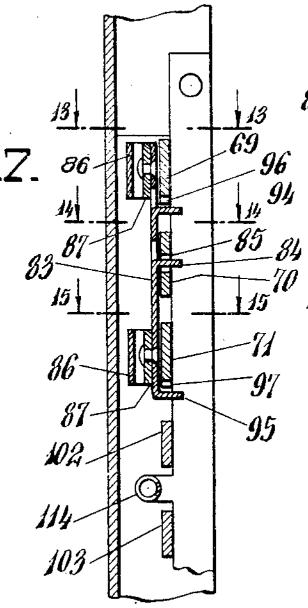
Figure 18:
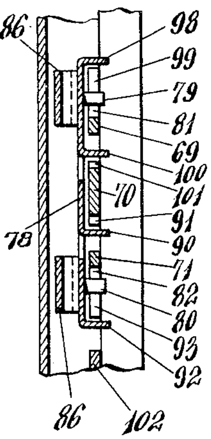
Figure 19:
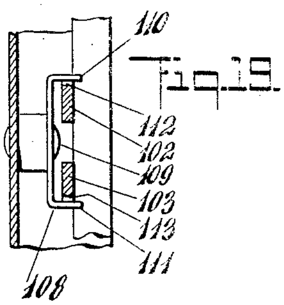

Fig. 11 is a broken side elevation with parts appearing in section, of the opinion expressing and voting keys with the interlocking and fifteen minute release mechanism;

Fig. 12 is a broken vertical sectional detail showing the so-called fifteen minute relay for automatically unlocking the voting buttons at the end of a broadcast period;

Figs. 13, 14, 15 and 16 are horizontal sectional views taken on substantially the planes of lines 13—13, 14—14, 15—15 and 16—16 of Fig. 11 and at corresponding lines in Fig. 17;

Figs. 17 and 18 are broken sectional details on substantially the planes of lines 17—17 and 18—18 of Fig. 13;

Fig. 19 is a broken sectional detail on the approximate plane of line 19—19 of Fig. 16.

The first form of the invention, Figs. 1 to 6, is like that disclosed in Patent No. 2,337,568 dated December 28, 1943, comprising a record strip or tape 20 running from a roll on the supply stool or reel 21 over a drive sprocket 22 to a take-up spool 23 and electrodes 24 positioned to impose distinguishing marks on the record strip.

The tape is shown as perforated along one edge at 25 to receive one or more teeth of the sprocket 22 and the latter is shown as having a conical, toothed clutch seat 26 at the back to receive a correspondingly shaped drive cone 27 on the forward end of a bushing 28. The latter is shown as having a ratchet 29 engaged by a spring pressed pawl 30, Fig. 3, on a stud 31 carried by the yoke 32 pivoted on shaft 33. This yoke is oscillated, in the form of the invention originally disclosed, at the beginning of each 15 minute or other broadcast period, by means of a magnet 34 having a core 35 connected with a slide 36 slotted at 37, Fig. 3, to engage the pin or stud 31.

Figures 1, 2, 3, 4, 5:
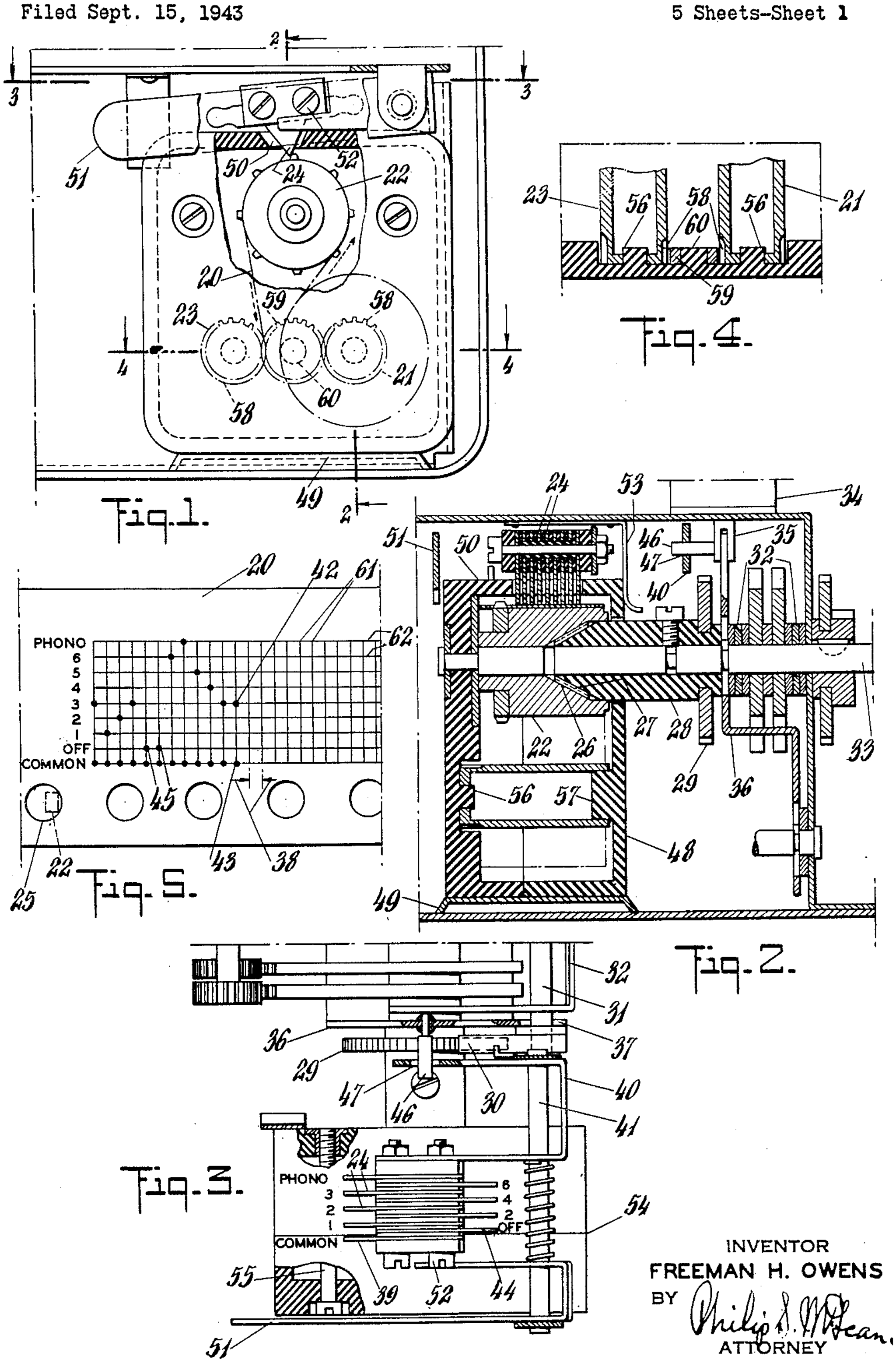
Fig. 2 is a broken cross sectional view of the same as on substantially the plane of line 2—2 of Fig. 1.
Fig. 3 is a broken part sectional plan view taken on substantially the plane of line 3—3 of Fig. 1.
Fig. 4 is a broken sectional detail on substantially the plane of line 4—4 of Fig. 1.
Fig. 5 is a plan of a portion of the record strip.

The sprocket 22 is thereby turned to advance the record tape 20 a distance 38, Fig. 5, representing one broadcast period, or other selected time interval, for each station selecting impulse of the machine.

The electrodes 24 are indicated as employed for designating different stations, 1 to 6, phonograph or other uses, and these, with a common return electrode 39, are mounted in insulated relation in a yoke-like holder 40 pivoted on a supporting shaft 41 and connected in the corresponding circuits, so that with each station selecting impulse, there will be a discharge from an electrode 24 representing the selected circuit, down through the tape, as at 42, Fig. 5, to the tape carrying sprocket 22 and by way of the latter, back through the tape to the common return 39, producing the second indicating mark or perforation 43.

By providing an "Off" electrode 44, a third mark as at 45 may be made on the strip, for a recording indicating the "On" and "Off" condition of the machine.

The entire gang of electrodes is automatically lifted off the record strip for each movement of the latter by having the pivot pin 46 of the magnet slide 36, Figs. 2 and 3, extend through a slot 47 in the inner arm of the electrode carrying yoke 40. The entire record tape mechanism is shown carried by and enclosed within an insulating case 48 which can be slipped into position on a support 49 at the back of the casing, to couple the sprocket 22 up with the intermittent drive mechanism therefor.

A slot 50 is shown in the top of the record box for entry of the electrodes and when this box is to be placed in or be removed from the machine, the electrodes may be lifted clear of this opening by a yoke lever 51 shown pivoted on the supporting shaft 41, with the outer arm serving as a handle and the inner arm extending in under the screw projection 52 of the pivoted electrode carrier.

The lever 51, in addition to serving as a means for lifting the electrodes, is shown as dropping down over the front of the record case, Figs. 1 and 2, to hold it up against the yielding stop 53, where the clutch for driving the sprocket 22 will be properly engaged and the electrodes will be properly lined up over the record strip.

As the record tape need be moved only a slight distance for each broadcast or other selected period, a short length of tape will carry a long time record and this in turn means that the record mechanism may be a small unit with simple mechanism for spooling the tape, such as indicated.

In the illustration, the casing is shown as of split construction at 54 with the two parts held together by through screws 55, and the spools 21, 23 are shown as removably engaged over journal projections 56, 57 on the opposite walls of the casing. These hollow spools are further shown as having gear toothed ends 58 meshing with an intermediate motion reversing pinion 59 journaled on a wall projection 60 between the spools. Thus, with this construction, the unwinding spool 21, through the intermediate pinion, drives the other, 23, as a take-up spool.

The service recorder may be locked in place so that it cannot be tampered with, thus to assure an accurate record of the use of the machine.

In the form of record illustrated in Fig. 5, the strip is laid off longitudinally in closely spaced, transversely extending divisions 61 representing time, such as broadcast intervals, and in longitudinally extending lines 62 representing broadcast stations, phonograph or other uses. These may be marked with time and station indications which may be directly read off the record, or the record may be put through a special decoding or translating mechanism, such as disclosed in the Owens patent application, Serial No. 566,787, filed December 6, 1944, for automatically totalizing and summarizing results, in which case such special markings on the tape may be considered unnecessary.

Figure 7:
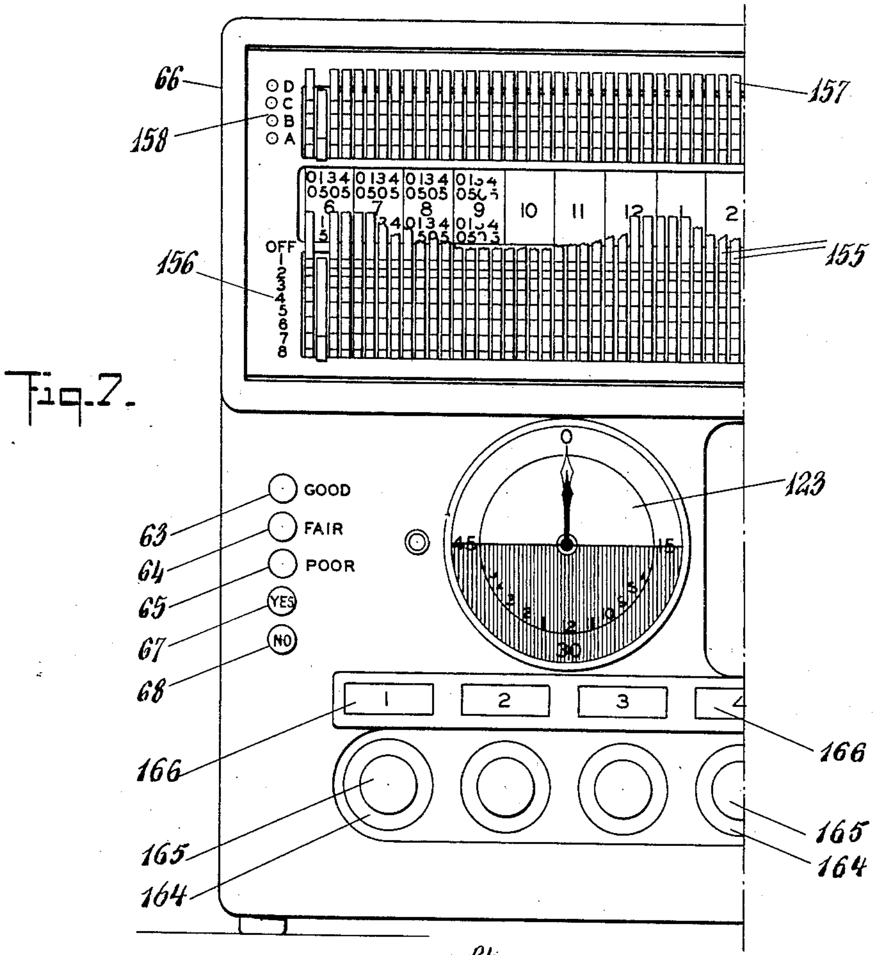
Fig. 7 is a partial front elevation of a program selecting radio receiver having the invention incorporated therein.
Figure 6:
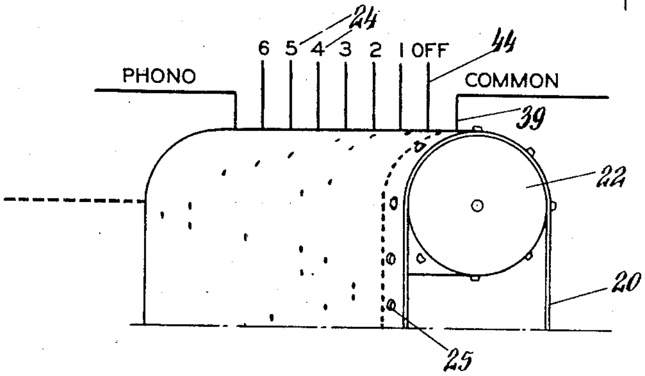
Fig. 6 is a diagrammatic view illustrating the electrical connections.

Figs. 7 and 8 illustrate an embodiment of the invention like that disclosed in co-pending Patent 2,411,890, and differing from that first considered in the provision of additional means for registering opinions and recording votes.

In the illustration, push buttons 63, 64, 65 are provided on the front of the program selecting receiver 66 for expressing opinions, such as "Good," "Fair," "Poor," and below these, buttons 67 and 68 for voting "Yes" and "No" on questions, candidates or the like.

The opinion expressing buttons 63, 64, 65 are shown in Fig. 11 as mounted on spring projected slides 69, 70, 71, the first carrying a contact 72, Fig. 13 to bridge the terminals 73 for closing a "Good" recording circuit, the second carrying contact 74 for bridging the terminals 75 of a "Fair" recording circuit and the third carrying contact 76 for bridging the terminal 77 of a "Poor" recording circuit.

These opinion registering slides are interlocked so that only one can be operated at a time by means consisting of a bar 78 extending transversely across the three slides and carrying pins 79, 80 in reversely inclined slots 81, 82 in the upper and lower slides, and a second transversely disposed bar 83 carrying a pin 84 in the inclined cam slot 85 in intermediate slide 70. These two interlock bars are shown carried by parallel links 86, 86, and 87, 87, pivoted at 88 and yieldingly held centered in the neutral position shown in Fig. 11 by a spring strip 89 bearing against the ends of the two sets of pivoted parallel links.

When the top button 63 is pressed, the bar 78 is raised by engagement of the incline 81 with pin 79 to carry the locking lug 90 thereon into holding engagement in the notch 91 in the lower edge of the lower slide 71, thus to lock the middle and lower slides.

Operation of the intermediate or "Fair" button causes cam slot 85 by engagement with pin 84 to raise bar 83 and carry the lugs 94 and 95 into engagement with notches 96, 97 in the upper and lower slides, thus to lock both of these.

Operation of the lower slide 71, through cam slot 82 and pin 80, lowers the locking bar 78 to carry lug 98 into engagement with notch 99 in the upper edge of the upper slide 69 and lug 100 into notch 101 in the upper edge of the intermediate slide, thus to then lock the upper and intermediate slides.

The "Yes" and "No" voting buttons on slides 102, 103 carry contacts 104, 105 to bridge the terminals 106, 107 of the "Yes" and "No" recording circuits, and these slides are interlocked so that only one or the other can be operated during any one broadcast period. The interlock for this purpose is shown as comprising a triangular plate 108 pivoted at 109 and having lugs 110, 111 operating in notches 112, 113 in the respective slides, said plate being centered by a spring 114. A spring pressed latch 115 is shown pivoted at 116 to snap into locking engagement into one or the other of two recesses 117, 118 in the slide 102.

When the upper "Yes" button 63 is pressed, the latch 115 will snap into the locking recess 117 and in such operation, the toggle plate 108 will project and hold the "No" button projected. Conversely, when the "No" button is operated, the toggle plate will project the "Yes" button slide, and in that event, the locking recess 118 will be engaged by the latch 115 to secure the buttons in that relation.

The voting buttons 67, 68 remain locked for the balance of the period in which one or the other has been operated, but are automatically released at the end of that period and at the commencement of the next period by the so-called "15 minute" or broadcast period magnet 119, which receives an impulse from the closing of the time control circuit and has a core 120 connected at 121 with the spring latch 115.

In Fig. 8, the timer control circuit is indicated as closed by a rotating timing switch 122 operated from the time clock 123.

The drive of the record strip in synchronism with the automatic station selecting mechanism may be effected by the intermittently acting mechanism first disclosed or by other means such as gearing from the time clock, as disclosed in Patent 2,411,890.

The electrodes for recording opinions and for voting are indicated at 124, connected by wiring 125 with the terminal contacts which are bridged by the switch contacts on the slides carrying these several buttons. The 15 minute magnet for releasing a voting slide which has been actuated is the one indicated at 119 and this is connected by wiring 126 with the timer 122 so as to release the voting buttons at the end of each period.

A condenser is indicated at 127 for preventing sparking across the breaker points 128, 129, of the timer and this same condenser may be connected as indicated at 130, Fig. 8, to furnish the discharge energy for making the recording perforations such as 42, 43, 45 in the record strip.

To furnish special markings which will indicate the beginning and ending of a full day's record, the 3 a. m. and 4 a. m. contacts 131, 132 of the distributor 133 operated as in Patent 2,411,890 which successively close the broadcast time circuits are shown connected by wiring 134, 135, across the "Yes" and "No" button circuits. Thus, at the end of each 24 hour interval, the record strip will carry a "Yes" and then a "No" marking, providing gages by which the record strip can be properly placed in a decoding machine.

If desired, however, a special 24 hour mark 151, Fig. 10, may be made upon the record by means of an extra electrode 152, Fig. 8, positioned, for instance, to cooperate with an extreme edge portion of the strip and connected by special wiring 153, with some unused contact of the distributor, for example, either the contact 131, 132, or 154, in what would ordinarily be an idle period in between two o'clock and six o'clock in the morning.

The recorder shown in Figs. 9 and 10 is like that disclosed in co-pending Patent 2,403,454 and differs from the first form of the invention shown in Figs. 1 to 6, particularly in that the recorder casing 136, is removably seated in a pocket or cavity 137, where it is releasably held by spring latches 138, entering notches 139 in opposite sides of the record case. Exposed finger-holds 140 enable these spring latches to be readily withdrawn to release the record case.

In this last construction also, the record tape is exposed at the bottom at an opening 141 in a spring retainer plate 141*a*, up through which the electrodes 24, 39, 124 and 152 extend. All of said electrodes are shown pivotally supported at 142 and as rocked upwardly into position for cooperation with the tape by spring 143. The retainer plate 141*a* yieldingly holds the record strip in position at the recording opening 141, both when the magazine is in position on the receiver and when it is removed from the receiver.

A tension spring 144 is indicated for drawing the latch levers together into holding engagement with the record case.

If desired, the latches 138 may have a suitable lock or locks so that only an authorized person with a key for the purpose may have access to the record strip.

In this particular embodiment of the invention, the sprocket wheel 22 is intermittently advanced step by step by companion gears 145, 146, from a shaft 147 intermittently advanced from the time train of the program selecting machine and the take-up spool 23 is turned by gearing 148, 149 from the gear 145 on the sprocket shaft 150.

The program preselecting mechanism illustrated, is like that disclosed in copending Patent No. 2,411,890, comprising keys 155, representing successive broadcast or other time periods, shiftable into the different station selecting positions represented by the scale 156, these, with the corresponding set of keys 157, shiftable to the different wave band selecting positions indicated at 158, serving to set up circuits for the station selecting magnets 161, one of which is shown in Fig. 8. The switch arm 159, of the distributor 133, in its rotation, successively engages the time contacts 160, which are connected with the station selecting magnets 161.

The timer 122, operated from the time clock 123, closes the circuits thus prepared, at each successive time interval to turn the receiver "on" or to leave it on for a particular station receiving setting, or possibly to turn the set "off" for that particular period, the "on" and "off" magnets so functioning, being indicated at 162, 163. The station selecting magnets 161, operate as described in the patent applications, either to close circuits for a pretuned and preset volume control, or to adjust a tuner to the proper position for bringing in the desired station.

The timer 122, as a part of its functions, closes the circuit through the recording electrode of the station, which may be in service or through the "off" indicating electrode, producing indicating perforations or marks in the record strip and for every twenty-four hour or other selected time interval, a special marking may be applied to the record, for instance, at the "Yes" and "No" positions, or at the special twenty-four hour indicating electrode 152.

Any one of the opinion recording buttons 63, 64, 65, may be actuated at any time to apply an opinion marking on the record and the record then will show the time and the station which was "on" when that opinion was expressed.

Either one of the voting buttons 67, 68, may be actuated at any time in any period of operation of the machine. Once the vote is registered, either "Yes" or "No," in a particular broadcast or other period, that vote will remain so until the end of that particular period, this by reason of the interlock which permits only one or the other of these two buttons to be actuated and then locks the set, so that the vote cannot be changed until the end of the period is reached.

In the Fig. 7 form of construction, a separate tuner and volume control is provided for each station. Thus there is a tuning knob 164, and a volume control knob 165, for each of the individual stations represented at 166, which are pretuned and preset to bring in those stations at the desired sound level whenever the magnet 161, for any such selected station is energized.

While ordinarily the condenser 127, may be relied upon for furnishing the energy required to make the record perforations in the strip, since this condenser is charged each time the timer switch opens the circuit at 128, 129, Fig. 8, it is contemplated, that some additional, constant charge source may be connected in with the recording buttons, so as to be always available, irrespective of the action of the timer switch.

What is claimed is:

1. An automatic radio station program selection recorder comprising in combination with electrically operated station selectors, a time train and means operable thereby for energizing preselected station selectors at different preselected time periods, means operated by said time train for longitudinally advancing a record strip having longitudinal time divisions and transverse station divisions in synchronism with the timed operation of said station selectors, an electrically operated station marker for each of said station selectors and disposed to register with the transversely arranged station divisions of the record strip, and electrical connections between the respective station selectors and corresponding station markers for effecting actuation of the station markers representing the respective station selectors at the selected times that the respective station selectors are operated.

2. An automatic radio station program selection recorder comprising in combination with electrically operated station selectors, a time train and means operable thereby for energizing preselected station selectors at different preselected time periods, means operated by said time train for longitudinally advancing a record strip having longitudinal time divisions and transverse station divisions in synchronism with the timed operation of said station selectors, an electrically operated station marker for each of said station selectors and disposed to register with the transversely arranged station divisions of the record strip, and electrical connections between the respective station selectors and corresponding station markers for effecting actuation of the station markers representing the respective station selectors at the selected times that the respective station selectors are operated, an electrically actuated "Off" recording marker associated with said station markers, an electrically operated "Off" selector under control of said time train and electrical connections between said "Off" selector and "Off" marker and whereby record will be made of the "Off" periods as well as the selected station periods.

3. An automatic radio station program selection recorder comprising in combination with electrically operated station selectors, a time train and means operable thereby for energizing preselected station selectors at different preselected time periods, means operated by said time train for longitudinally advancing a record strip having longitudinal time divisions and transverse station divisions in synchronism with the timed operation of said station selectors, an electrically operated station marker for each of said station selectors and disposed to register with the transversely arranged station divisions of the record strip, and electrical connections between the respective station selectors and corresponding station markers for effecting actuation of the station markers representing the respective station selectors at the selected times that the respective station selectors are operated, electrically actuated opinion expression markers associated with the transversely grouped station markers and opinion expressing means electrically connected with said opinion markers and operable arbitrarily independent of the time train for effecting opinion markings on the time division portions of the record strip.

4. An automatic radio station program selection recorder comprising in combination with electrically operated station selectors, a time train and means operable thereby for energizing preselected station selectors at different preselected time periods, means operated by said time train for longitudinally advancing a record strip having longitudinal time divisions and transverse station divisions in synchronism with the timed operation of said station selectors, an electrically operated station marker for each of said station selectors and disposed to register with the transversely arranged station divisions of the record strip, and electrical connections between the respective station selectors and corresponding station markers for effecting actuation of the station markers representing the respective station selectors at the selected times that the respective station selectors are operated, electrically actuated opinion expression markers associated with the transversely grouped station markers and opinion expressing means electrically connected with said opinion markers and operable arbitrarily independent of the time train for effecting opinion markings on the time division portions of the record strip, means for automatically locking the expressing means when one is actuated and means controlled by the time train for automatically releasing the locked expressing means at the end of a time division in which one of said expressers has been actuated and locked.

5. An automatic radio station program selection recorder comprising in combination with electrically operated station selectors, a time train and means operable thereby for energizing preselected station selectors at different preselected time periods, means operated by said time train for longitudinally advancing a record strip having longitudinal time divisions and transverse station divisions in synchronism with the timed operation of said station selectors, an electrically operated station marker for each of said station selectors and disposed to register with the transversely arranged station divisions of the record strip, and electrical connections between the respective station selectors and corresponding station markers for effecting actuation of the station markers representing the respective station selectors at the selected times that the respective station selectors are operated, a special code marker associated with said first mentioned markers and means controlled by said time train for effecting operation of said code marker after passage of a predetermined number of time intervals.

6. A listener preference recorder for station program selection receivers comprising a time train, a record medium enclosing magazine, a support for removably holding said magazine in a predetermined, temporarily fixed relation, station program recording means on said support, said magazine having an opening to expose said record medium to said recording means in said fixed position of the magazine on said support and provided with means for advancing said record medium arranged to be coupled in driven relation with said time train in said temporarily fixed relation of the magazine on said support and means operable from said time train for selectively energizing said station program recording means in accordance with station program selection at times established by said time train and means operated by said time train when said record medium is coupled in driven relation therewith for applying special time indicating markings to said record medium and whereby said record medium, when removed from the magazine, may be orientated with respect to time for decoding the information applied thereto by said recording means.

7. In combination with a program selecting receiver having a time train and means for bringing in selected station programs at selected times, means for recording listener preference comprising a magazine, means for removably connecting said magazine in predetermined relation to said receiver, said magazine having record spooling mechanism arranged to be coupled in driven relation with said time train when said magazine is so connected with said receiver, said receiver having choice recording markers identified with different station programs and arranged to be selectively energized by the bringing in of selected station programs, said choice recording markers being positioned for cooperation with record medium advanced by said spooling mechanism when said magazine is removably connected with said receiver as described.

8. Apparatus for recording information pertinent to the tuning condition of a wave signal receiver comprising a recorder including a detachable magazine having disposed therein a driven member and a recording element associated therewith, means for moving said recording element in a predetermined manner when said magazine is associated with said recorder, means for producing an indication on said element representative of the tuning condition of said receiver, and means for automatically and periodically applying time information on said element whereby said element may be orientated with respect to time.

9. Apparatus for producing a record of the transmitting stations to which a wave signal receiver is tuned for reception, comprising a unit associated with the receiver and provided with a magazine receiving cavity, a recording magazine adapted to be detachably mounted in said magazine receiving cavity and including a mechanism for driving a recording element, means in said unit for actuating said mechanism to drive said recording element, in a predetermined manner when said magazine is mounted in said cavity, means in said unit controlled in accordance with the tuning of said receiver for producing a record on said element of the transmitting stations received by said receiver during the period when said magazine is supported in said cavity, and means for automatically providing independent time markings on said element to provide gages for orientating the record on said element with respect to time whereby subsequent decoding of said record may more readily be accomplished.

10. Apparatus for producing a record of the channels to which a wave signal receiver is tuned for reception, comprising a recording unit associated with the receiver including means defining a pocket therein, a recording magazine adapted to be detachably mounted in said pocket and including a mechanism for driving a recording element, means in said unit for actuating said mechanism to drive said recording element in a predetermined manner with respect to time when said magazine is mounted in said pocket, and means in said unit controlled in accordance with the tuning of said receiver for producing a record on said element of the channels to which said receiver is tuned during the period when said magazine is mounted in said cavity.

11. Apparatus for recording information pertinent to the tuning condition of a wave signal receiver comprising a recorder including a detachable magazine having disposed therein a driven member and a recording element associated therewith, means for moving said recording element in a predetermined manner with respect to time when said magazine is associated with said recorder, means for producing an indication on said element representative of the tuning condition of said receiver, and independent means for automatically and periodically applying time information on said element whereby the record on said element is automatically orientated with respect to time.

12. Apparatus for recording information relative to the particular radio broadcasting stations to which a wave signal receiver is tuned, comprising a recording mechanism including a housing having a cavity defined therein, a readily removable and insertable magazine adapted to be disposed in said cavity, a driven member rotatably mounted in said magazine for driving a record tape movable with said driven member, driving means engageable with said driven member when said magazine is disposed in said cavity for moving said tape in a predetermined manner with respect to time, a first means for producing a trace on said tape representative of a tuning condition of said receiver, a second means for producing a time trace on said tape, and means for rendering said second means effective once every twenty-four hour period for applying accurate time information to said tape so that when said magazine is removed from said cavity said type may readily be orientated with respect to time when decoding the information contained thereon with respect to the tuning condition of said receiver.

13. A recording system of the character disclosed comprising time control mechanism for advancing record medium in accordance with the passage of time, means for applying identifying indications of different significance to the recording medium advanced by such time control mechanism, selectively operable devices for associating markings of different significance with the identifying indications so applied to the record medium, means for immediately locking one of said selectively operable devices when another of said devices is actuated and means governed by said time control mechanism for automatically effecting the release of such a locked device at the end of a predetermined interval.

14. A recording system of the character disclosed comprising a time train, a detachable magazine having record spooling mechanism therein, means for supporting said magazine in position with said spooling mechanism coupled in driven relation with said time train, record marking elements movably supported for cooperative relation with said spooling mechanism when said magazine is in position coupled with said time train or for position clear of said time train and means for securing said magazine in position with said spooling mechanism coupled to the time train, said securing means being movable to release the magazine from said coupled position and connected to effect shifting of said marking elements away from said spooling mechanism when said securing means is shifted to release the magazine to permit removal of the same from said time train and marking elements.

FREEMAN H. OWENS.

REFERENCES CITED

The following references are of record in the file of this patent:

UNITED STATES PATENTS

| Number | Name | Date |
|---|---|---|
| 478,016 | O'Kelly | June 28, 1892 |
| 688,184 | Lee | Dec. 3, 1901 |
| 907,235 | Herrick | Dec. 22, 1908 |
| 1,142,604 | Moore | June 8, 1915 |
| 1,240,763 | Nicol | Sept. 18, 1917 |
| 1,304,977 | Helsel | May 27, 1919 |

| Number | Name | Date |
|---|---|---|
| 1,519,633 | Schirmer | Dec. 16, 1924 |
| 1,753,923 | Felty | Apr. 8, 1930 |
| 1,762,791 | O'Neill | June 10, 1930 |
| 1,805,665 | Hough | May 19, 1931 |
| 1,864,768 | Seeling | June 28, 1932 |
| 1,897,850 | La Pierre | Feb. 14, 1933 |
| 1,947,157 | Harris | Feb. 15, 1934 |
| 1,954,955 | Siebers | Aug. 17, 1934 |
| 2,035,474 | Hay | Mar. 31, 1936 |
| 2,074,118 | Ross et al. | Mar. 16, 1937 |
| 2,101,430 | Goldbert et al. | Dec. 7, 1937 |
| 2,132,808 | Sigo | Oct. 11, 1938 |
| 2,200,076 | Cooper | May 7, 1940 |
| 2,213,886 | Potter | Sept. 3, 1940 |
| 2,214,522 | Chappell et al. | Sept. 10, 1940 |
| 2,284,813 | Gary | June 2, 1942 |
| 2,289,513 | Mastney | July 14, 1942 |
| 2,303,472 | Johnston | Dec. 1, 1942 |
| 2,311,322 | Zimmerman et al. | Feb. 16, 1943 |
| 2,338,180 | Harrison | Jan. 4, 1944 |